(12) United States Patent
Armstrong et al.

(10) Patent No.: US 12,460,308 B2
(45) Date of Patent: Nov. 4, 2025

(54) SOLID OXIDE ELECTROLYZER CELL INCLUDING ELECTROLYSIS-TOLERANT AIR-SIDE ELECTRODE

(71) Applicant: BLOOM ENERGY CORPORATION, San Jose, CA (US)

(72) Inventors: Tad Armstrong, Burlingame, CA (US); Justin Railsback, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 707 days.

(21) Appl. No.: 17/519,996

(22) Filed: Nov. 5, 2021

(65) Prior Publication Data
US 2023/0141938 A1   May 11, 2023

(51) Int. Cl.
| | | |
|---|---|---|
| *C25B 13/07* | (2021.01) | |
| *C25B 1/04* | (2021.01) | |
| *C25B 9/19* | (2021.01) | |
| *C25B 9/65* | (2021.01) | |
| *C25B 9/70* | (2021.01) | |
| *C25B 13/02* | (2006.01) | |

(52) U.S. Cl.
CPC ............... *C25B 13/07* (2021.01); *C25B 9/19* (2021.01); *C25B 9/65* (2021.01); *C25B 9/70* (2021.01); *C25B 13/02* (2013.01); *C25B 1/04* (2013.01)

(58) Field of Classification Search
None
See application file for complete search history.

(56) References Cited

U.S. PATENT DOCUMENTS

| | | |
|---|---|---|
| 6,821,663 B2 | 11/2004 | McElroy et al. |
| 6,854,688 B2 | 2/2005 | McElroy et al. |
| 6,924,053 B2 | 8/2005 | McElroy et al. |
| 7,045,238 B2 | 5/2006 | Gottmann et al. |
| 7,150,927 B2 | 12/2006 | Hickey et al. |
| 7,364,810 B2 | 4/2008 | Sridhar et al. |
| 7,575,822 B2 | 8/2009 | Mitlitsky et al. |
| 7,951,509 B2 | 5/2011 | Cassidy et al. |
| 8,268,502 B2 | 9/2012 | Nguyen et al. |
| 8,293,412 B2 | 10/2012 | McElroy |
| 8,580,456 B2 | 11/2013 | Armstrong et al. |
| 9,583,771 B2 | 2/2017 | Parihar et al. |
| 10,249,883 B2 | 4/2019 | Leming et al. |

(Continued)

FOREIGN PATENT DOCUMENTS

CN    112663079 A    4/2021

OTHER PUBLICATIONS

Qiang et al, J Solid State Electrochem (2009) 13:455-467 (Year: 2009).*

(Continued)

*Primary Examiner* — Louis J Rufo
(74) *Attorney, Agent, or Firm* — THE MARBURY LAW GROUP PLLC

(57) ABSTRACT

A solid oxide electrolyzer cell (SOEC) includes a solid oxide electrolyte, a fuel-side electrode disposed on a fuel side of the electrolyte, and an air-side electrode disposed on an air side of the electrolyte. The air-side electrode includes a barrier layer disposed on the air side of the electrolyte and including a first doped ceria material, and a functional layer disposed on the barrier layer and including an electrically conductive material and a second doped ceria material.

8 Claims, 5 Drawing Sheets

(56) References Cited

U.S. PATENT DOCUMENTS

| | | |
|---|---|---|
| 10,431,833 B2 | 10/2019 | Wilson et al. |
| 10,784,521 B2 | 9/2020 | El Batawi et al. |
| 2006/0166070 A1* | 7/2006 | Hickey ............... H01M 8/1246 264/618 |
| 2006/0216575 A1 | 9/2006 | Cassidy |
| 2009/0061279 A1* | 3/2009 | Larsen ............... H01M 8/1226 429/410 |
| 2009/0130505 A1 | 5/2009 | McElroy |
| 2010/0129693 A1 | 5/2010 | Nguyen et al. |
| 2011/0183233 A1 | 7/2011 | Armstrong et al. |
| 2012/0043010 A1 | 2/2012 | Batawi et al. |
| 2013/0284591 A1 | 10/2013 | Delahaye et al. |
| 2014/0017579 A1 | 1/2014 | Hata |
| 2014/0193743 A1 | 7/2014 | Esposito |
| 2016/0133947 A1 | 5/2016 | Leming et al. |
| 2018/0166692 A1 | 6/2018 | Yoon et al. |
| 2018/0205096 A1 | 7/2018 | Hiraiwa et al. |
| 2019/0181458 A1* | 6/2019 | Leming ............... H01M 4/9066 |
| 2022/0190373 A1 | 6/2022 | Armstrong |
| 2023/0223555 A1 | 7/2023 | Armstrong et al. |

OTHER PUBLICATIONS

Celikbilek et al J. Mater. Chem. A, 2019,7, 25102-25111 (Year: 2019).*

U.S. Appl. No. 17/120,426, filed Dec. 14, 2020, Bloom Energy Corp.

U.S. Appl. No. 17/318,527, filed May 12, 2021, Bloom Energy Corp.

Extended European Search Report dated Apr. 6, 2023 in corresponding European Application No. 22205645.9.

Lopez-Robledo M.J., et al., "Reversible operation of microtubular solid oxide cells using La0.6Sr0.4Co0.2Fe0.8O3-[delta]-Ce0.9Gd0.1O2-[delta] oxygen electrodes", Journal of Power Sources, vol. 378, Feb. 1, 2018, pp. 184-189, XP093036076, Amsterdam,NL ISSN: 0378-7753, DOI: 10.1016/j.ipowsour.2017.12.035.

Nechache Aziz, et al., "Alternative and innovative solid oxide electrolysis cell materials: A short review", Renewable and Sustainable Energy Reviews, Elseviers Science, New York, NY, US, vol. 149, Jun. 27, 2021, XP086732169, ISSN: 1364-0321, DOI: 10.1016/J.RSER.2021.111322.

Extended European Search Report for corresponding European Patent Application No. 23150902.7, dated Aug. 11, 2023, 9 pages.

Taguchi, H. et al., "LNF SOFC cathodes with active layer using Pr6O11 or Pr-doped CeO2", Journal of Power Sources, vol. 241 (May 30, 2013), pp. 768-775, XP028675817.

* cited by examiner

SOLID OXIDE ELECTROLYZER CELL INCLUDING ELECTROLYSIS-TOLERANT AIR-SIDE ELECTRODE

The present disclosure is directed generally to solid oxide electrolyzer cells, and more specifically, to electrolyzer cells including electrolysis-tolerant air-side electrodes.

BACKGROUND

Solid oxide reversible fuel cell (SORFC) systems may be operated in a fuel cell mode to generate electricity by oxidizing a fuel. SORFC systems may also be operated in an electrolysis mode to generate hydrogen by electrolyzing water. However, prior art SORFCs may suffer from air-side electrode degradation due to cell voltage increases that may occur during the electrolysis process.

SUMMARY

According to various embodiments a solid oxide electrolyzer cell (SOEC) comprises a solid oxide electrolyte, a fuel-side electrode disposed on a fuel side of the electrolyte, and an air-side electrode disposed on an air side of the electrolyte. The air-side electrode comprises a barrier layer disposed on the air side of the electrolyte and comprising a first doped ceria material, and a functional layer disposed on the barrier layer and comprising an electrically conductive material and a second doped ceria material.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%. In addition, weight percentages (wt. %) and atomic percentages (at. %) as used herein respectively refer to a percent of total weight or a percent of a total number of atoms of a corresponding composition.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "electrolyzer cell stack," as used herein, means a plurality of stacked electrolyzer cells that can optionally share a common water inlet and exhaust passages or risers. The "electrolyzer cell stack," as used herein, includes a distinct electrical entity which contains two end plates which are connected directly to power conditioning equipment and the power (i.e., electricity) input of the stack or comprises a portion of an electrolyzer cell column that contains terminal plates which provide electrical input.

Figure 1A:
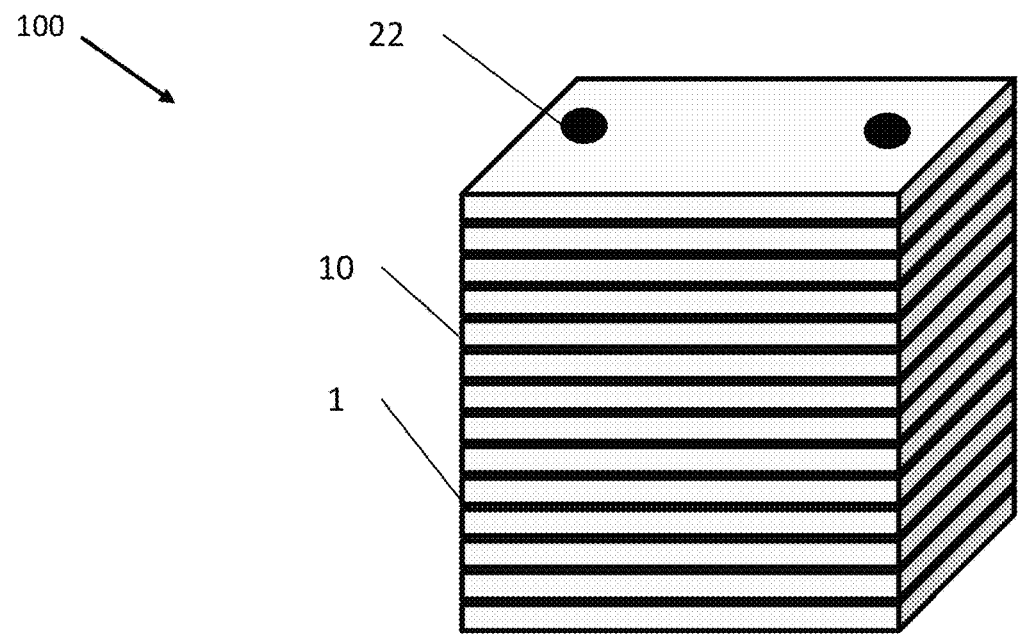
FIG. 1A is a perspective view of a SOEC stack, according to various embodiments of the present disclosure.
Figure 1B:
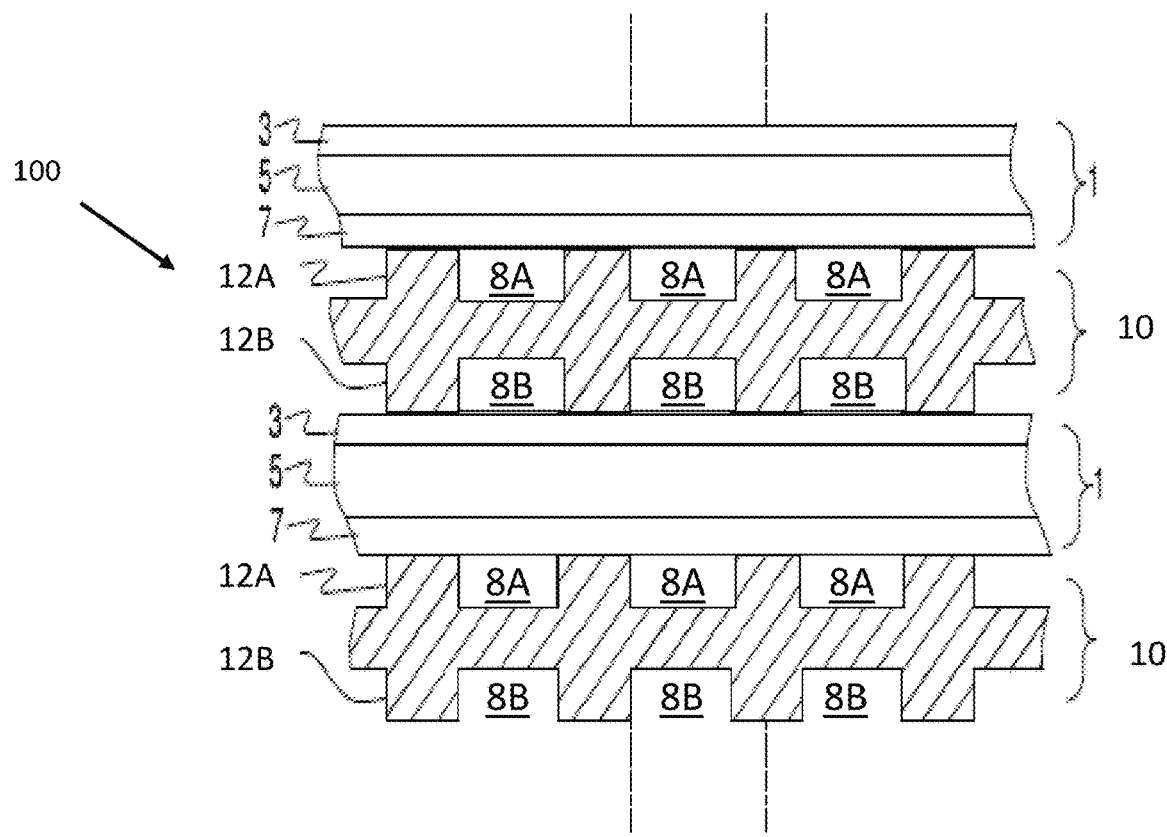
FIG. 1B is a cross-sectional view of a portion of the stack of FIG. 1A.

FIG. 1A is a perspective view of an electrolyzer cell stack 100, and FIG. 1B is a sectional view of a portion of the stack 100, according to various embodiments of the present disclosure. Referring to FIGS. 1A and 1B, the stack 100 may be a solid oxide electrolyzer cell (SOEC) stack that includes solid oxide electrolyzer cells 1 separated by interconnects 10. Referring to FIG. 1B, each electrolyzer cell 1 comprises an air-side electrode 3, a solid oxide electrolyte 5, and a fuel-side electrode 7.

Electrolyzer cell stacks are frequently built from a multiplicity of electrolyzer cells 1 in the form of planar elements, tubes, or other geometries. Although the electrolyzer cell stack 100 in FIG. 1A is vertically oriented, electrolyzer cell stacks may be oriented horizontally or in any other direction. For example, water may be provided through water conduits 22 (e.g., water riser openings) formed in each interconnect 10 and electrolyzer cell 1, while oxygen may be provided from the side of the stack between air side ribs of the interconnects 10.

Each interconnect 10 electrically connects adjacent electrolyzer cells 1 in the stack 100. In particular, an interconnect 10 may electrically connect the fuel-side electrode 7 of one electrolyzer cell 1 to the air-side electrode 3 of an adjacent electrolyzer cell 1. FIG. 1B shows that the lower electrolyzer cell 1 is located between two interconnects 10. A Ni mesh (not shown) may be used to electrically connect the interconnect 10 to the fuel-side electrode 7 of an adjacent electrolyzer cell 1.

Each interconnect 10 includes fuel-side ribs 12A that at least partially define fuel channels 8A and air-side ribs 12B that at least partially define oxidant (e.g., air) channels 8B. The interconnect 10 may operate as a separator that separates water flowing to the fuel-side electrode of one cell 1 in the stack from oxygen flowing from the air-side electrode of an adjacent cell 1 in the stack. At either end of the stack 100, there may be an air end plate or fuel end plate (not shown).

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron (e.g., 5 wt. % iron), optionally 1 or less weight percent yttrium and balance chromium alloy), and may electrically connect the fuel-side electrode 7 of one electrolyzer cell 1 to the air-side electrode 3 of an adjacent electrolyzer cell 1.

Figure 2A:
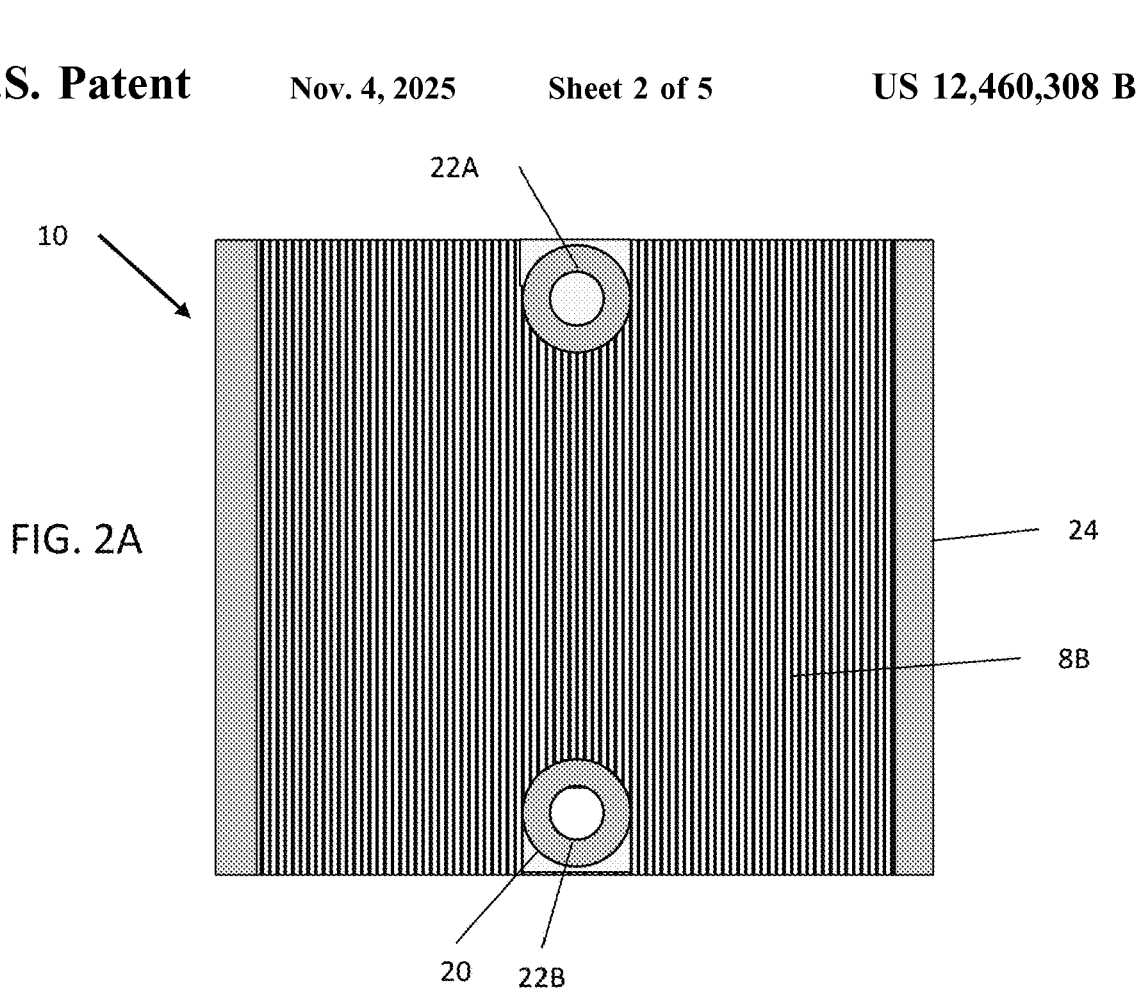
FIG. 2A is a plan view of an air side of an interconnect, according to various embodiments of the present disclosure.
Figure 2B:
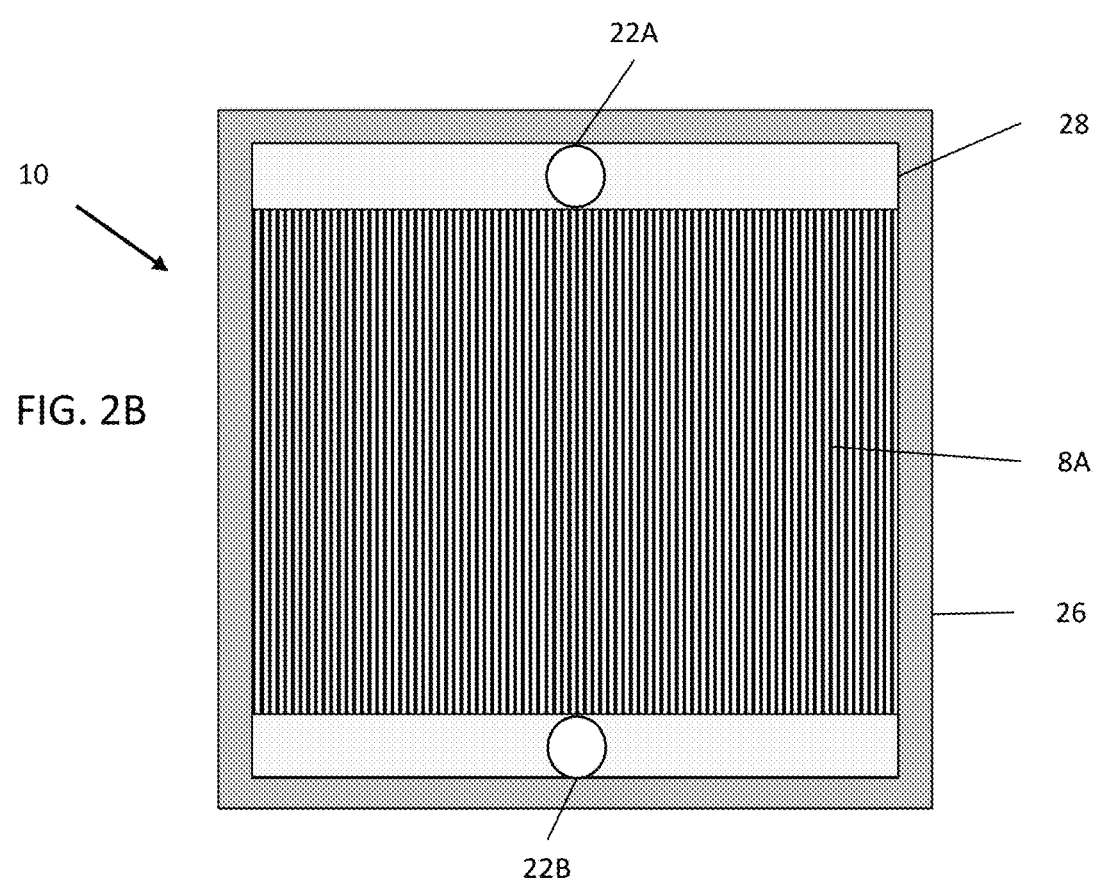
FIG. 2B is a plan view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B that extend from opposing first and second edges of the interconnect 10. Oxygen flows through the air channels 8B from the air-side electrode 3 of an adjacent electrolyzer cell 1. Ring seals 20 may surround fuel holes 22A, 22B of the interconnect 10, to prevent water from contacting the air-side electrode 3. Strip-shaped peripheral seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

Referring to FIGS. 1B and 2B, the fuel side of the interconnect 10 may include the fuel channels 8A and fuel manifolds 28. Water flows from one of the fuel holes 22A (e.g., inlet fuel hole that forms part of the fuel inlet riser), into the adjacent manifold 28, through the fuel channels 8A, and to the fuel-side electrode 7 of an adjacent electrolyzer cell 1. Excess water may flow into the other fuel manifold 28 and then into the outlet fuel hole 22B. A frame seal 26 is disposed on a peripheral region of the fuel side of the interconnect 10. The peripheral region may be an elevated plateau which does not include ribs or channels. The surface of the peripheral region may be coplanar with tops of the ribs 12A.

Figure 3A:
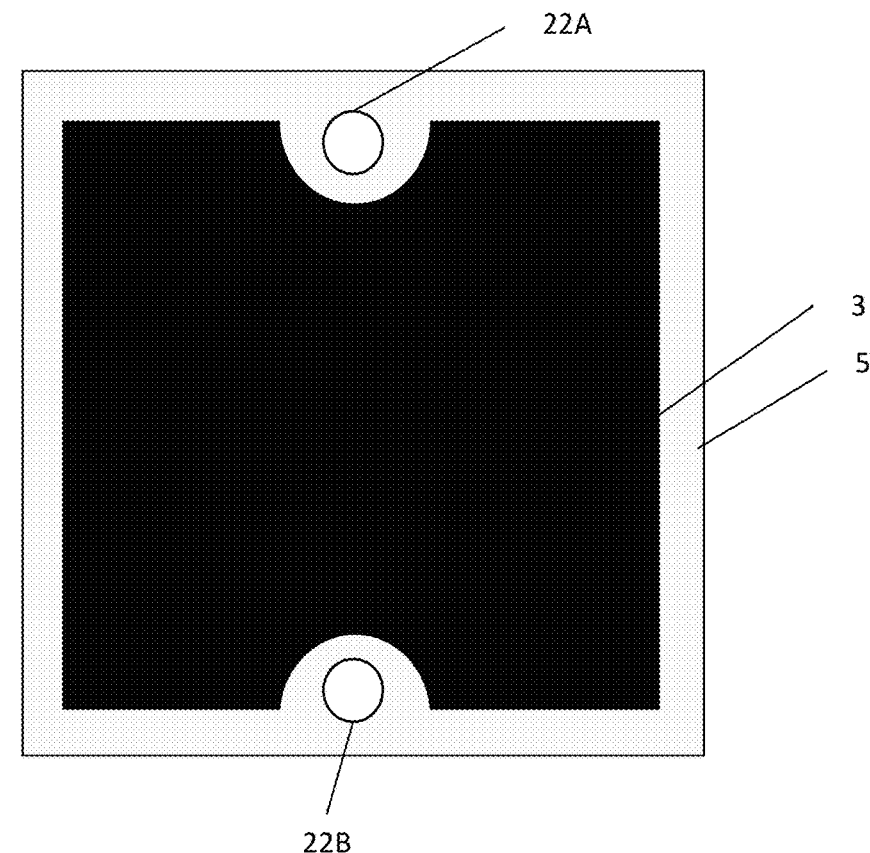
FIG. 3A is a plan view of an air side of a SOEC cell, according to various embodiments of the present disclosure.
Figure 3B:
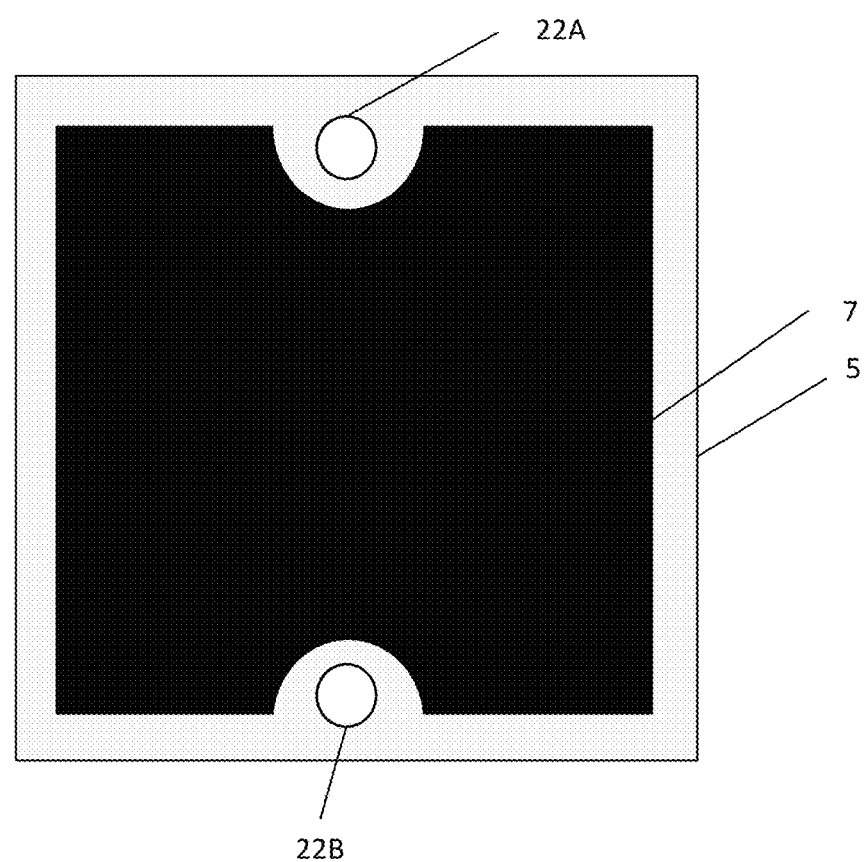
FIG. 3B is a plan view of a fuel side of the SOEC cell of FIG. 3A.

FIG. 3A is a plan view of the air side of the electrolyzer cell 1, and FIG. 3B is a plan view of the fuel side of the electrolyzer cell 1, according to various embodiments of the present disclosure. Referring to FIGS. 1A, 2A, 3A, and 3B, the electrolyzer cell 1 may include an inlet fuel hole 22A, an outlet fuel hole 22B, the electrolyte 5, and the air-side electrode 3. The air-side electrode 3 may be disposed on the air side of the electrolyte 5. The fuel-side electrode 7 may be disposed on an opposing fuel (e.g., water) side of the electrolyte 5.

The fuel holes 22A, 22B may extend through the electrolyte 5 and may be arranged to overlap with the fuel holes 22A, 22B of the interconnects 10, when assembled in the electrolyzer cell stack 100. The air-side electrode 3 may be printed on the electrolyte 5 so as not to overlap with the ring seals 20 and the peripheral seals 24 when assembled in the electrolyzer cell stack 100. The fuel-side electrode 7 may have a similar shape as the air-side electrode 3. The fuel-side electrode 7 may be disposed so as not to overlap with the frame seal 26, when assembled in the stack 100. In other words, the electrodes 3 and 7 may be recessed from the edges of the electrolyte 5, such that corresponding edge regions of the electrolyte 5 may directly contact the corresponding seals 20, 24, 26.

In one embodiment, the electrolyzer cell stack 100 may only be operated in the electrolysis mode. Thus the electrolyzer cell stack 100 is not operated in a fuel cell mode to generate power from a fuel and air provided to fuel-side and air-side electrodes, respectively. Alternatively, the electrolyzer cell stack 100 may comprise a solid oxide regenerative (i.e., reversible) fuel cell (SORFC) stack. SORFCs can be operated in a fuel cell (FC) mode (e.g., power generation mode), in order to generate electricity from fuel and air provided to fuel-side and air-side electrodes, respectively, and may be operated in an electrolyzer cell (EC) mode (e.g., electrolysis mode) in order to produce hydrogen and oxygen from water provided to the fuel-side electrode 7. In the FC mode, oxygen ions are transported from the air-side (e.g., cathode) electrode 3 to the fuel-side (e.g., anode) electrode 7 of the SORFC to oxidize the fuel (e.g., hydrogen and/or hydrocarbon fuel, such as natural gas) and to generate electricity. In EC mode, a positive potential is applied to the air side of the cell, and the oxygen ions are transported from the water at the fuel-side electrode 7 through the electrolyte 5 to the air-side electrode 3. Thus, water is electrolyzed into hydrogen at the fuel-side electrode 7 and oxygen at air-side electrode 3.

The air-side electrode 3 and the fuel-side electrode 7 of a SORFC respectively operate as a cathode and an anode during FC mode, and respectively operate as an anode and a cathode during EC mode (i.e., a FC mode cathode is an EC mode anode, and a FC mode anode is an EC mode cathode). Accordingly, the SORFCs described herein may be referred to as having air-side electrodes and fuel-side electrodes.

During the EC mode, water in the fuel stream is reduced ($H_2O+2e^-\rightarrow O_2^-+H_2$) to form $H_2$ gas and $O_2^-$ ions, the $O_2^-$ ions are transported through the solid electrolyte, and then oxidized on the air-side electrode ($O_2^-$ oxidized to $O_2$) to produce molecular oxygen. Since the open circuit voltage for a SORFC operating with air and wet fuel (e.g., hydrogen and/or reformed natural gas) may be from about 0.9 to 1.0V (depending on water content), the positive voltage applied to the air-side electrode in EC mode increases the cell voltage to typical operating voltages of from about 1.1 to 1.3V. In constant current mode, the cell voltages may increase over time if there is degradation of the cell, which may result from both ohmic sources and electrode polarization.

One of the major hurdles encountered with state-of-the-art solid oxide electrolyzer cells and SORFCs is the delamination of the air electrode at high current densities. The degree of delamination increases with the current density and the flux of oxide ion transport. Without wishing to be bound by a particular theory, it is believed that the delamination may be caused by the precipitation of oxygen at the electrolyte/cathode interface, which can lead to high pressures resulting in air electrode delamination.

Figure 4:
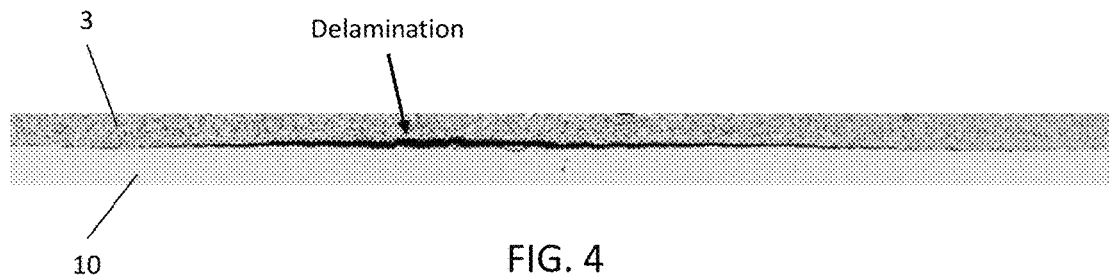
FIG. 4 is a photograph showing air electrode delamination.

FIG. 4 is a photograph showing air electrode 3 delamination after operating a solid oxide electrolyzer cell in electrolysis mode for an extended time at a high current density. As shown in FIG. 4, the air-side electrode 3 may separate from the underlying electrolyte 5, as indicated by the black area there between.

Figure 5:
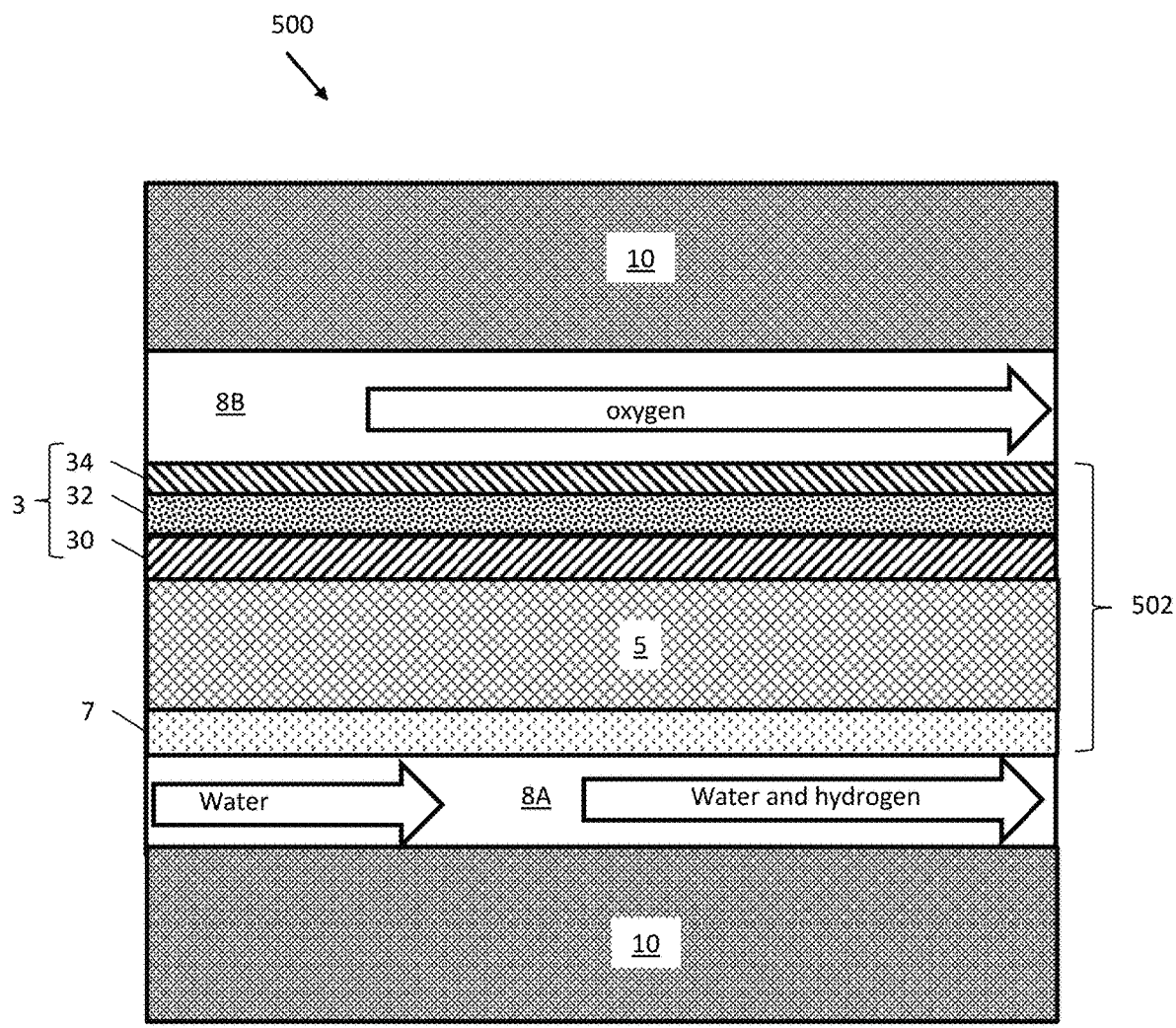
FIG. 5 is a cross-sectional view of a SOEC stack including an electrolysis-tolerant SOEC cell, according to various embodiments of the present disclosure.

FIG. 5 is a cross-sectional view of an electrolyzer cell stack 500 including an electrolysis-tolerant solid oxide electrolyzer cell 502, according to various embodiments of the present disclosure. The electrolyzer cell stack 500 is similar to the stack 100 of FIGS. 1A-3B. As such, only the differences there between will be discussed in detail.

Referring to FIG. 5, the electrolyzer cell stack 500 may include at least one electrolyzer cell 502 disposed between interconnects 10. The electrolyzer cell 502 may operate only in the electrolysis mode (e.g., the cell may comprise a solid oxide electrolyzer cell (SOEC)), or may operate in both fuel cell and electrolysis modes (e.g., the electrolyzer cell 502 may comprise a SORFC). The electrolyzer cell 502 includes a solid oxide electrolyte 5, an air-side electrode 3 disposed on an air side of the electrolyte 5, and a fuel-side electrode 7 disposed on a fuel side of the electrolyte 5. Air may be provided to the air-side electrode 3 by air channels 8B in a fuel cell mode, and fuel may be provided to the fuel-side electrode 7 by fuel channels 8A in the fuel cell mode, while water may be provided to the fuel-side electrode 7 by fuel channels 8A in the electrolysis mode.

Various materials may be used for the solid oxide electrolyte 5, the fuel-side electrode 7, and air-side electrode 3. In various embodiments, the electrolyte 5 may include an ionically conductive material or phase, such as a stabilized zirconia, for example scandia-stabilized zirconia (SSZ), yttria-stabilized zirconia (YSZ), scandia-ceria-stabilized zirconia (SCSZ), scandia-ceria-yttria-stabilized zirconia (SCYSZ), scandia-ceria-ytterbia-stabilized zirconia (SCYbSZ), or the like. Alternatively, the electrolyte 5 may comprise another ionically conductive material, such as a doped ceria, for example samaria-doped ceria (SDC), gadolinia-doped ceria (GDC), or yttria-doped ceria (YDC). In some embodiments, the electrolyte 5 may comprise a material represented by the formula: $(ZrO_2)_{1-w-x-z}(Sc_2O_3)_w(CeO_2)_x(Y_2O_3)_a(Yb_2O_3)_b$, wherein $0.09 \leq w \leq 0.11$, $0 < x \leq 0.0125$, $a+b=z$, and $0.0025 \leq z \leq 0.0125$. In some embodiments, the electrolyte 5 may comprise $(ZrO_2)_{0.88}(Sc_2O_3)_{0.1}(CeO_2)_{0.01}(Yb_2O_3)_{0.01}$ or $(ZrO_2)_{0.88}(Sc_2O_3)_{0.1}(CeO_2)_{0.01}(Y_2O_3)_{0.01}$. Alternatively, the electrolyte 5 may comprise $(ZrO_2)_{0.89}(Sc_2O_3)_{0.1}(CeO_2)_{0.01}$.

The fuel-side electrode 7 may comprise a cermet layer comprising a metal-containing phase and a ceramic phase. The metal-containing phase may include a metal catalyst, such as nickel (Ni), cobalt (Co), copper (Cu), alloys thereof, or the like, which operates as an electron conductor. The metal catalyst may be in a metallic state or may be in an oxide state. For example, the metal catalyst forms a metal oxide when it is in an oxidized state. Thus, the fuel-side electrode 7 may be annealed in a reducing atmosphere prior to operation of the electrolyzer cell 1, to reduce the oxidized metal catalyst to a metallic state.

The metal-containing phase may consist entirely of nickel in a reduced state. This nickel-containing phase may form nickel oxide when it is in an oxidized state. Thus, the fuel-side electrode 7 is preferably annealed in a reducing atmosphere prior to operation to reduce the nickel oxide to nickel.

The ceramic phase of the fuel-side electrode 7 may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YbCSSZ), or the like. In the YbCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %, as disclosed in U.S. Pat. No. 8,580,456, which is incorporated herein, by reference.

Furthermore, if desired, an additional contact or current collector layer may be placed over the fuel-side electrodes 7. For example, a Ni or nickel oxide anode contact layer may be formed on the fuel-side electrode 7.

The air-side electrode 3 may include a barrier layer 30 disposed directly on an air side of the electrolyte 5, a functional layer 32 disposed on the barrier layer 30, and an optional current collector layer 34 disposed on the functional layer 32. Thus, the functional layer 32 is located between the barrier layer 30 and the current collector layer 34.

The barrier layer 30 may be sintered to the air side of the electrolyte 5. The barrier layer 30 may comprise, consist essentially or, or consist of a doped ceria material. For example, the barrier layer may comprise from about 95 weight percent (wt. %) to about 100 wt. % of the doped ceria material, based on the total weight of the barrier layer 30. The doped ceria material may include samarium-doped ceria (SDC) and/or gadolinium-doped ceria (GDC).

The SDC may be represented by the formula: $Ce_{1-x}Sm_xO_{2-d}$, where x ranges from 0.1 to 0.3. For example, specific SDC materials may be represented by the formulas: $Ce_{0.8}Sm_{0.2}O_{2-d}$, $Ce_{0.9}Sm_{0.1}O_{2-d}$, and $Ce_{0.7}Sm_{0.3}O_{2-d}$, where d ranges from 0 to 0.2, such as from 0 to 0.1.

The GDC may be represented by the formula $Ce_{1-x}Gd_xO_{2-d}$, where x ranges from 0.1 to 0.3 and d ranges from 0 to 0.2, such as from 0 to 0.1. For example, specific GDC materials may be represented by the formulas: $Ce_{0.9}Gd_{0.1}O_{2-d}$, $Ce_{0.8}Gd_{0.2}O_{2-d}$, and $Ce_{0.7}Gd_{0.3}O_{2-d}$, where d ranges from 0 to 0.2, such as from 0 to 0.1.

The functional layer 32 may include a mixture of an electrically conductive material and the doped ceria material. The electrically conductive material may comprise an electrically conductive perovskite material, such as lanthanum strontium manganite (LSM), lanthanum strontium cobalt ferrite (LSCF), lanthanum strontium cobaltite (LSC), lanthanum strontium cobalt manganite (LSCM), lanthanum strontium ferrite (LSF), $La_{0.85}Sr_{0.15}Cr_{0.9}Ni_{0.1}O_3$ (LSCN), combinations thereof, or the like. In some embodiments, the electrically conductive material may preferably comprise LSM and/or LSCF. Alternatively, the electrically conductive material may comprise a metal, such as platinum. For example, the functional layer 32 may include from about 10 wt. % to about 90 wt. % of the electrically conductive material described above, and from about 10 wt. % to about 90 wt. % of the doped ceria material.

In various embodiments, the functional layer may include the LSM as the electrically conductive material. The LSM may be represented by the formula: $(La_{1-z}Sr_z)_qMnO_{3-d}$, wherein z ranges from 0.1 to 0.4, q ranges from 0.94 to 1, such as 0.96 to 1, and d ranges from 0 to 0.2. For example, the LSM may comprise $La_{0.8}Sr_{0.2}MnO_{3-d}$ or A-site deficient LSM, such as $(La_{0.8}Sr_{0.2})_{0.98}MnO_{3-d}$, wherein d ranges from 0 to 0.1.

In some embodiments, the functional layer may include the LSCF as the electrically conductive material. The LSCF may be represented by the formula: $(La_xSr_{1-x})_yCo_zFe_{1-z}O_{3-\delta}$, wherein x ranges from 0.4 to 0.8, y ranges from 0.94 to 1.0, z ranges from 0.01 to 0.99, and $\delta$ is the equilibrium oxygen deficiency which ranges from 0 to 0.1. For example, the LSCF may comprise $La_{0.58}Sr_{0.4}Co_{0.2}Fe_{0.8}O_{3-\delta}$, $(La_{0.6}Sr_{0.4})_{0.98}Co_{0.2}Fe_{0.8}O_{3-\delta}$, or $(La_{0.6}Sr_{0.4})_{0.95}Co_{0.2}Fe_{0.8}O_{3-\delta}$, where $\delta$ is the equilibrium oxygen deficiency.

The barrier layer 30 and the functional layer 32 may include the same doped ceria material or different doped ceria materials. For example, the barrier layer 30 may include GDC and the functional layer 32 may include LSM and GDC, or LSM and SDC. In other embodiments, the barrier layer 30 may include SDC and the functional layer 32 may include LSM and SDC, or LSM and GDC. In other embodiments, the barrier layer may include SDC and the functional layer may include LSCF and SDC, or LSCF and GDC.

While not wishing to be bound by a particular theory, it is believed that the mixed oxide-ion and electronic conduction of the ceria phases of the barrier layer 30 reduces the overpotential at the interface between the barrier layer 30 and the functional layer 32. The reduction in overpotential may suppress the air-side electrode 3 delamination from the electrolyte 5.

The current collector layer 34 may include an electrically conductive material, such as an electrically conductive metal oxide, such as LSM. However, other conductive perovskites, such as LSC, LSCM, LSCF, LSF, LSCN, etc., or metals, such as Pt, may also be used.

Figure 6A:
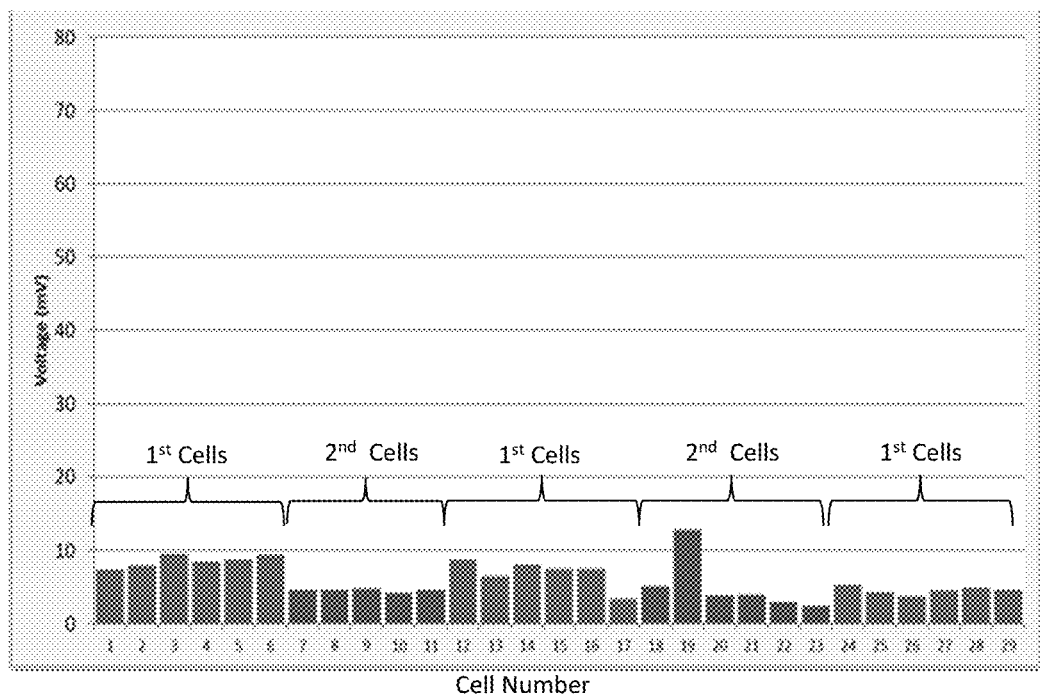
FIG. 6A is a chart showing the degradation rate of an air electrode of an SOEC cell according to various embodiments of the present disclosure.
Figure 6B:
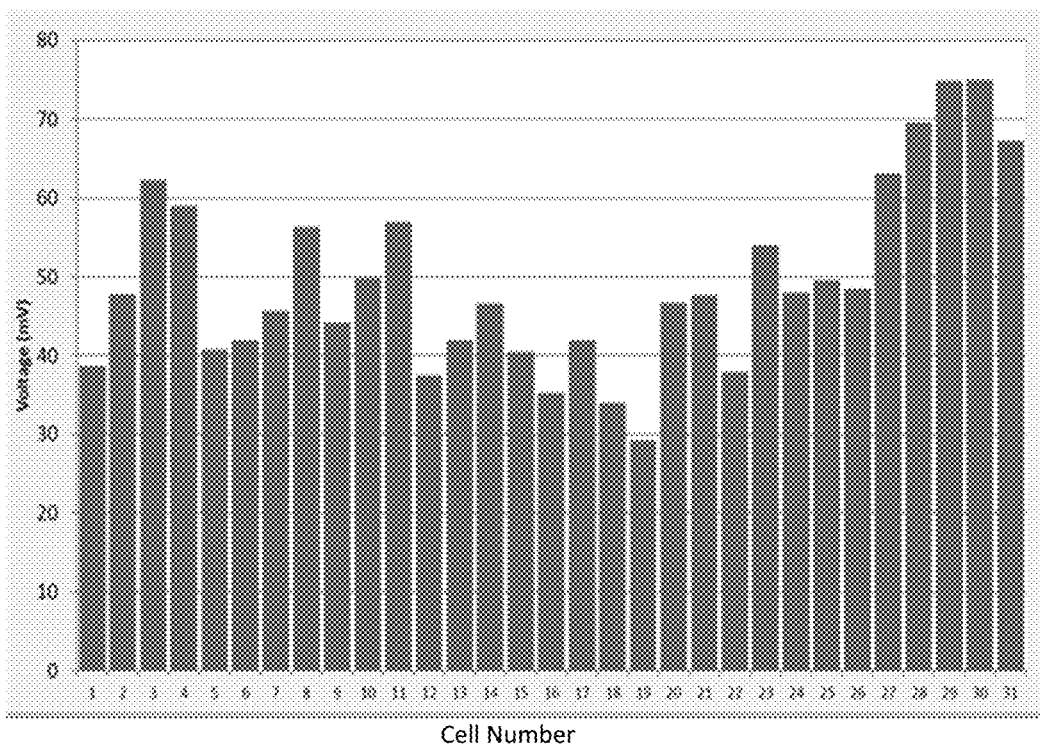
FIG. 6B is a chart showing the degradation rate of a comparative SOEC cell.

FIG. 6A is a chart showing a voltage change of first embodiment SOEC cells and second embodiment SOEC cells, between beginning of life and 17 current cycles of operation in an embodiment SOEC stack. FIG. 6B is a chart showing the voltage change of comparative SOEC cells between beginning of life and 17 current cycles of operation in a comparative SOEC stack, under similar conditions. The y-axis in both figures is the voltage change in volts, and the x-axis is a number of the SOEC cell in the respective stack.

Referring to FIGS. 6A and 6B, the first and second embodiment SOEC cells have similar configurations, except that the first embodiment SOEC cells contain SDC barrier layers 30 and GDC/LSM cathode functional layers 32, while the second embodiment SOEC cells contain SDC barrier layers 30 and SDC/LSM cathode functional layers 32. The comparative SOEC cells include no barrier layers 30 and cathode functional layers that comprise YSZ/LSM.

Referring to FIGS. 6A and 6B, higher cell voltage differences indicate higher cell over-potentials, and thus, higher cathode degradation. As can be seen in the charts, the comparative SOEC cells experience higher cell voltage differences (and thus an increase in cell over-potential), while the embodiment cells exhibit substantially lower cell voltage differences. Accordingly, the doped ceria-based barrier layer and cathode functional layer materials provide an unexpectedly improved protection against cell over-potential, which is expected to decrease delamination and/or general cathode degradation.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A solid oxide electrolyzer cell (SOEC) comprising:
    a solid oxide electrolyte;
    a fuel-side electrode disposed on a fuel side of the electrolyte; and
    an air-side electrode disposed on an air side of the electrolyte, the air-side electrode comprising:
        a barrier layer disposed on the air side of the electrolyte and comprising a first samarium-doped ceria (SDC) material as a first doped ceria material;
        a functional layer disposed on the barrier layer and comprising an electrically conductive material and a second doped ceria material comprising a second samarium-doped ceria (SDC) material wherein:
            the electrically conductive material comprises lanthanum strontium cobalt ferrite (LSCF) represented by a formula $(La_xSr_{1-x})_yCo_zFe_{1-z}O_{3-\delta}$, wherein x ranges from 0.4 to 0.8, y ranges from 0.94 to 1.0, z ranges from 0.01 to 0.99, and $\delta$ is an equilibrium oxygen deficiency which ranges from 0 to 0.1; and
            the second SDC material is represented by a formula $Ce_{1-x}Sm_xO_{2-d}$, wherein x ranges from 0.1 to 0.3, and d ranges from 0 to 0.2; and
        an electrically-conductive perovskite current collector layer disposed on the air side of the functional layer opposite the barrier layer.

2. The SOEC of claim 1, wherein the first SDC material is represented by a formula $Ce_{1-x}Sm_xO_{2-d}$, wherein x ranges from 0.1 to 0.3, and d ranges from 0 to 0.2.

3. The SOEC of claim 2, wherein the first SDC material comprises $Ce_{0.8}Sm_{0.2}O_{2-d}$, $Ce_{0.9}Sm_{0.1}O_{2-d}$, or $Ce_{0.7}Sm_{0.3}O_{2-d}$, wherein d ranges from 0 to 0.1.

4. The SOEC of claim 1, wherein the electrically-conductive perovskite current collector layer comprises lanthanum strontium manganite (LSM), lanthanum strontium cobalt ferrite (LSCF), lanthanum strontium cobalt manganite (LSCM), lanthanum strontium ferrite (LSF), or lanthanum strontium nickel chromite (LSCN).

5. The SOEC of claim 4, wherein the electrically-conductive perovskite current collector layer comprises the lanthanum strontium cobalt ferrite (LSCF).

6. The SOEC of claim 1, wherein the LSCF comprises $La_{0.58}Sr_{0.4}Co_{0.2}Fe_{0.8}O_{3-\delta}$.

7. The SOEC of claim 1, wherein the LSCF comprises $(La_{0.6}Sr_{0.4})_{0.98}Co_{0.2}Fe_{0.8}O_{3-\delta}$.

8. The SOEC of claim 1, wherein the LSCF comprises $(La_{0.6}Sr_{0.4})_{0.95}Co_{0.2}Fe_{0.8}O_{3-\delta}$.

* * * * *